(12) United States Patent
Gillespie, IV et al.

(10) Patent No.: US 10,553,102 B1
(45) Date of Patent: Feb. 4, 2020

(54) METHODS AND APPARATUSES FOR PERSONAL SAFETY

(71) Applicant: Ripple Network Technologies, Inc., Fort Lauderdale, DC (US)

(72) Inventors: Rees Bowen Gillespie, IV, Boca Raton, FL (US); Jaime A. Gomez, Fort Lauderdale, FL (US); Mladen Barbaric, Montreal (CA)

(73) Assignee: Ripple Network Technologies, Inc., Fort Lauderdale, FL (US)

( * ) Notice: Subject to any disclaimer, the term of this patent is extended or adjusted under 35 U.S.C. 154(b) by 0 days.

(21) Appl. No.: 15/955,676

(22) Filed: Apr. 17, 2018

Related U.S. Application Data

(60) Provisional application No. 62/486,185, filed on Apr. 17, 2017.

(51) Int. Cl.
*G08B 25/01* (2006.01)

(52) U.S. Cl.
CPC .................. *G08B 25/016* (2013.01)

(58) Field of Classification Search
CPC .......... G08B 1/08; H04M 11/04; H04M 11/00
USPC .................. 340/7.58, 539.1; 455/404.2, 550
See application file for complete search history.

(56) References Cited

U.S. PATENT DOCUMENTS

| | | | |
|---|---|---|---|
| 6,262,655 B1 * | 7/2001 | Yoshioka ............. | G08B 25/016 340/425.5 |
| 6,596,954 B2 * | 7/2003 | Miyashita ............. | H01H 13/48 200/406 |
| 7,933,579 B2 * | 4/2011 | Jenkins ................ | G08B 25/016 340/539.12 |
| 8,117,676 B1 * | 2/2012 | Cardoso ................. | A42B 3/044 2/410 |
| 8,249,547 B1 * | 8/2012 | Fellner ............... | G08B 21/0446 455/404.1 |
| 9,412,249 B2 * | 8/2016 | Smith ..................... | A44C 15/00 |
| 9,443,415 B2 * | 9/2016 | Nepo ................... | G08B 25/016 |
| 9,646,473 B2 * | 5/2017 | Ros ...................... | G08B 15/004 |
| 9,691,570 B1 * | 6/2017 | Dinh ..................... | H01H 13/10 |
| 9,715,819 B1 * | 7/2017 | Stockdale ............ | G08B 25/016 |
| 9,911,290 B1 * | 3/2018 | Zalewski ............. | G07G 1/0072 |
| 9,947,211 B1 * | 4/2018 | Mayer .................... | H04W 4/90 |
| 2003/0027547 A1 * | 2/2003 | Wade .................. | G08B 25/016 455/404.1 |
| 2004/0266390 A1 * | 12/2004 | Faucher ............. | G08B 21/0211 455/404.1 |
| 2010/0156626 A1 * | 6/2010 | Story ...................... | G01S 19/17 340/539.13 |
| 2010/0291883 A1 * | 11/2010 | Lim ..................... | H04B 1/3833 455/90.2 |
| 2011/0319048 A1 * | 12/2011 | Matlock ............... | G08B 25/016 455/404.1 |
| 2014/0194083 A1 * | 7/2014 | Aldossary ........... | H04M 1/0202 455/404.1 |

(Continued)

*Primary Examiner* — Nam V Nguyen
(74) *Attorney, Agent, or Firm* — Mederos Legal, PLLC; Diana Mederos

(57) ABSTRACT

A discrete wearable device having a tactile switch, wireless connection capabilities, and is integrated with a personal security, concierge, or service system. The device integrates with accessories such as personal articles like zippers and bra straps and with containers such as a case, cover, or jewelry locket. The device connects to a first responder and automatically launches a smart device application with the push of the tactile switch.

16 Claims, 9 Drawing Sheets

(56) References Cited

U.S. PATENT DOCUMENTS

| | | | |
|---|---|---|---|
| 2014/0366249 A1* | 12/2014 | West | A44C 3/001 |
| | | | 2/244 |
| 2016/0240075 A1* | 8/2016 | Eisenman | G08B 13/1672 |
| 2017/0215033 A1* | 7/2017 | Piraino | H04B 1/385 |

* cited by examiner

METHODS AND APPARATUSES FOR PERSONAL SAFETY

CROSS REFERENCE TO RELATED APPLICATION

This application claims the benefit of U.S. Provisional Application No. 62/486,185, entitled Methods and Apparatuses for Personal Security, filed Apr. 17, 2017, which is hereby incorporated by reference in its entirety for all purposes.

TECHNICAL FIELD

The present disclosure relates to methods and apparatuses for a personal security system. The present disclosure pertains to a wearable personal security device having a tactile switch with tiered levels of compressibility correlating with a user's perception of severity of an emergency or troublesome situation or based on desired selection of response. More specifically, the present disclosure presents a customizable wearable security device in wireless communication with a personal security system in further communication with first responders or other designated response persons.

BACKGROUND

Traditional forms of personal safety devices have been geared towards the elderly who live independently but who may still need to reach a first responder for assistance in case of an injury or other emergency. Most of these devices and systems involve the use of a telephone, implementing multiple steps to reach a first responder, and being limited to one type of emergency responder such as the city's police department or a single company's own first response team.

Traditional wearable personal safety devices are not discreet, are embarrassing and intrusive, draw unnecessary attention, require multiple steps to use, and are more accessible to potential criminals, tortfeasors, batterers, predators, kidnappers, attackers, or other offenders or threats. In present commercial examples, if a person feels threatened and wants to avoid a situation, the person may touch the traditional wearable personal safety device which may raise suspicion of those near the person. This may attract unwanted attention especially amongst younger and less mature populations. Obvious activation of a personal security device may amplify a potentially threatening situation into a situation where the person is harmed by the potential attacker—the opposite of the purpose of a personal safety system.

Traditional personal safety devices and systems are limited and not customizable. Furthermore, traditional personal safety devices are not intuitive to the qualities and characteristics of the area, nearby people, potential threats, and potential rescue aids. In traditional personal security systems, the same level of emergency response is initiated regardless of the severity of the situation. This deters the person from ever initiating an emergency signal except in circumstances of grave danger. This further makes traditional personal safety devices and systems inefficient and ineffective.

Communities, entities, institutions, groups, and businesses have not been able to effectively, efficiently, and seamlessly implement community-specific emergency notification and response systems. Members within the same community are not in efficient connection with one another to be able to assist a peer in an emergency or troublesome situation. For example, if a person fell down some steps in a stairwell and could not stand up, the person's best option would be to access his/her cellular phone to call a coworker or 9-1-1 in hopes the coworker answers the call and is nearby or that adequate reception is available to reach 9-1-1. Otherwise, the person who fell may end up stranded in the stairwell.

Traditional personal safety systems are limited to the availability of a wireless communication reception. The effectiveness of the emergency response application is limited to the speed, strength, and availability of a wireless signal. Some entities such as universities have placed blue light poles sporadically around campuses. These blue light poles likely have a telephone connected to a landline. However, access is limited and not instantaneous.

SUMMARY

What is needed is the device, methods, and systems as described in the disclosure for a device couple with a response system. The disclosure comprises a discrete wearable device having a tactile switch, wireless connection capabilities, and is integrated with a personal security, concierge, or service system.

A device comprises a front cover, a total PCB or circuit board assembly, at least one communications antenna, at least one tactile switch, a battery, an attachment piece, a contact spring, a main PCBA or frame, and a rear cover. The device integrates with accessories such as personal articles like zippers and bra straps and with containers such as a case, cover, or jewelry locket.

A user customizes a user profile with emergency contact information and medical history and designates guardians. A user initiates an emergency response appropriate to the level of perceived danger or desire by pumping a tactile switch having tiered recognition. A user can configure various tactile command patterns to initiate a configured task.

The device connects to a first responder or to the nearest community member with or without a device if the user's security device fails or the user is otherwise inaccessible. The device and system integrate the use of biometric sensors, algorithms, data input, and/or global positioning to determine automatically the level of emergency; automatically launching a smart device application with the push of the tactile switch.

BRIEF DESCRIPTION OF THE DRAWINGS

The accompanying drawings that are incorporated in and constitute a part of this specification, illustrate several embodiments of the disclosure and, together with the description, serve to explain the principles of the disclosure.

REFERENCE NUMERALS OF THE DRAWINGS

Figure 1A:
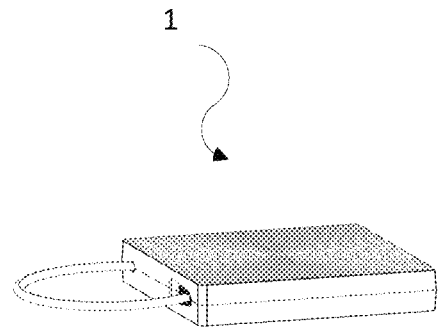
FIG. 1A, FIG. 1B, FIG. 1C, and FIG. 1D. illustrate multiple views of an exemplary personal security device.
Figure 1B:
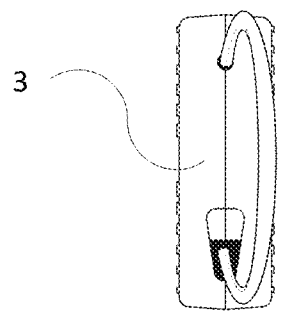
Figure 1C:
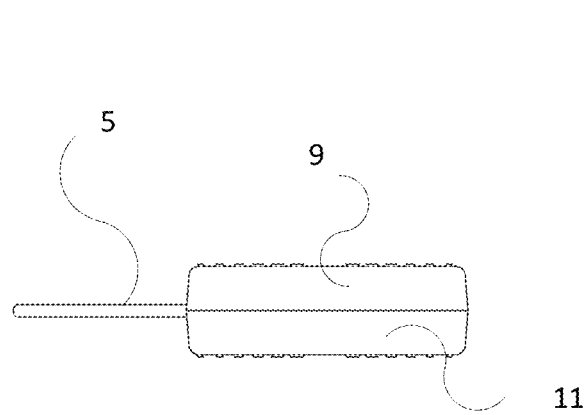
Figure 1D:
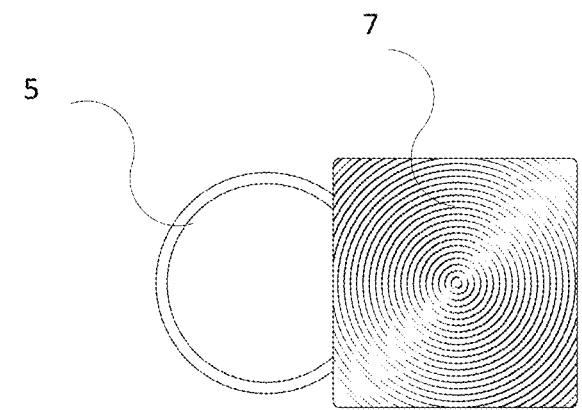

The following list refers to the drawings.
1 device
3 housing
5 attachment piece
7 surface
9 front cover
11 rear cover
13 pin assembly
15 pin assembly lower part
17 latch
19 end
21 interior space
23 exterior space
25 frame
27 battery
29 circuit board assembly
31 tactile switch
33 communication antenna
35 contact spring
37 personal article
39 locket
41 tactile nodule
43 top
45 side
47 hinge
49 bottom
51 smart device
53 wireless communication
55 server
57 response service

DETAILED DESCRIPTION

Introduction

The present disclosure provides generally for methods and apparatuses for personal security. In the following sections, detailed descriptions of examples and methods of the disclosure will be given. The description of both preferred and alternative examples are exemplary only, and it is understood to those skilled in the art that variations, modifications, and alterations may be apparent. Therefore, the examples do not limit the breadth of the aspects of the underlying disclosure as defined by the claims.

Generally, the exemplary apparatus described herein is a discrete wearable device having a tactile switch, wireless connection capabilities, and is integrated with a personal security system. Nevertheless, applicability is not limited to personal security. Additional applicability pertains to concierge, shopping, wirelessly connecting, and tracking. Features include the ability of a user to customize a user profile with emergency contact information and medical history and designate guardians; initiate an emergency response appropriate to the level to perceived danger by pumping a tactile switch having tiered recognition; connecting a first responder to the nearest community member with a security device if the user's security device fails or the user is otherwise inaccessible; the use of biometric sensors, algorithms, data input, and/or global positioning to determine automatically the level of emergency; automatically launching a smart device application with the push of the tactile switch; configure various tactile command patterns to initiate a configured task.

The exemplary system and methods of use as described herein pertain to a personal safety device wirelessly linked to a smart device with an application in communication with a central processing unit and database in a closed or subscriber-access system where only members of a particular group or community may load and save a profile on the closed or subscriber-access system. First responders may be designated by each user and may be monitored by designated community personnel. The designated community personnel may function as an operator if needed and connect to an outside first response team. In addition, a public service answering point may be contacted automatically and without the ability to select a specific emergency or first response center such as a specific police or fire station.

A personal security device may be wearable on clothing or accessories, interchangeable with accessories and add-ons, or may be attached as an additional button to a smart device. The personal security device, system, and methods of use are designed to be user-friendly, discrete, efficient, effective, customizable, and intuitive to the user, surroundings, and assessed level of danger or potential threats. Additional benefits include the ability for a designated backup, concierge service, and contact, and payment method information storage and access.

A personal security device and system may be especially helpful within school settings, workplace campuses, gated communities, daycares, hospitals, or any other closed or exclusive group. Everyone in that particular group may be connected within the same security system and monitored by designated guardians such as campus police. Users within the same closed community are connected so that users may be notified if another user nearby is in trouble or if a potentially troublesome situation may occur due to a user's past history as indicated by patterns and tracking of a user's habits. Not only is the system intuitive and adaptive based on the user's habits and history, but the system is intuitive and adaptive according to surroundings.

Glossary

"tactile switch" as used herein means a button, trigger, or tactile structure to which a user pumps, selects, clicks, touches, depresses, or applies pressure and in turn launches a signal to further a chain of events.

"security device" or "device" as used herein means a wearable, discrete member as described herein.

"electronic communication" as used herein means the propagation, transmission, acceptance, and/or processing of data between devices via satellite, Bluetooth, NFC, WiFi, cellular telephone towers and systems.

"first responder" as used herein means local rescuers such as the fire department, police department, animal control, operator, paramedic, hospital staff, security guard, bouncer, constable, guardian, or other designated rescuer.

"attachment piece" as used herein means an object and or means for securing a personal security device to an object.

"personal article" as used herein means any object of clothing, accessory, jewelry, or footwear a user can wear and to which a device can attach.

"container" as used herein means any object capable of at least partially housing a device while allowing tactile functionality of the device without removal of the device from the container.

DETAILED DESCRIPTIONS OF THE DRAWINGS

The drawings herein illustrate various exemplary embodiments of a personal security device, a system for personal safety, and methods of using a personal security device and system.

Referring now to FIG. 1A, FIG. 1B, FIG. 1C, and FIG. 1D, multiple views of an exemplary personal security device are illustrated. In some embodiments, a personal security device may be in a compact three-dimensional or two-dimensional form and may be constructed from synthetic materials, natural materials, or a combination. Some personal security devices may have a smooth, textured, or three-dimensional surface. A biometric sensor may be integrated into the device. A device may be recyclable, biodegradable, or permanent. A device may be made with interchangeable parts or may be constructed with fixed parts or a single piece of material. Some embodiments of a device may have a means for securing the device to a person's clothing, accessories, or other objects such as an electronic device. The object and means for securing the device, the attachment piece, may be a pin assembly, a bracket, a clip, a strap, or a loop and may be fixed or interchangeable.

Some embodiments of a personal security device may have multiple exterior parts that fit together to create a housing defining interior space and exterior space. Some embodiments of a device exterior may be such to create a water-resistant and/or weatherproof housing. A pin assembly may be present on one of a plurality of facets of a device. In preferred embodiments, buttons, sensors, indicators, scanners, haptic feedback pads, or touchscreens may be flush with the surface of the device so as to be discrete. The preferred goal is for a device to blend in seamlessly and have the appearance of an accessory.

Figure 2A:
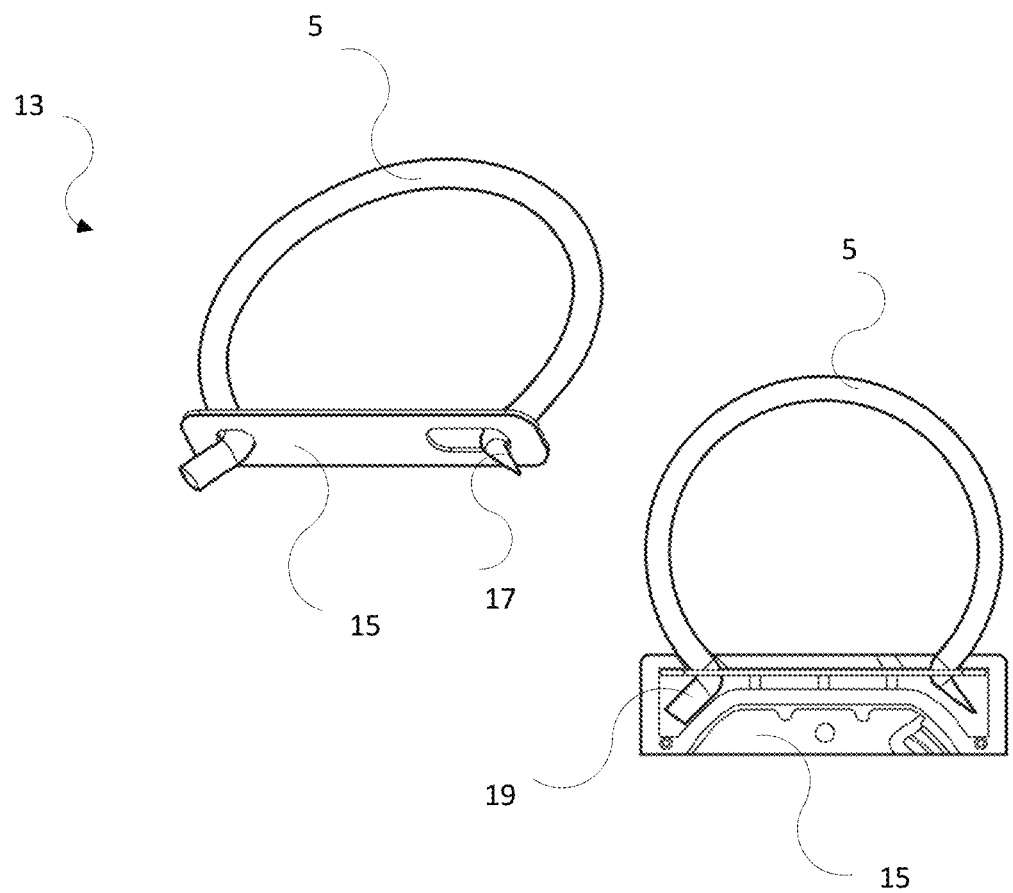
FIG. 2A illustrates an exemplary embodiment of a pin assembly
Figure 2B:
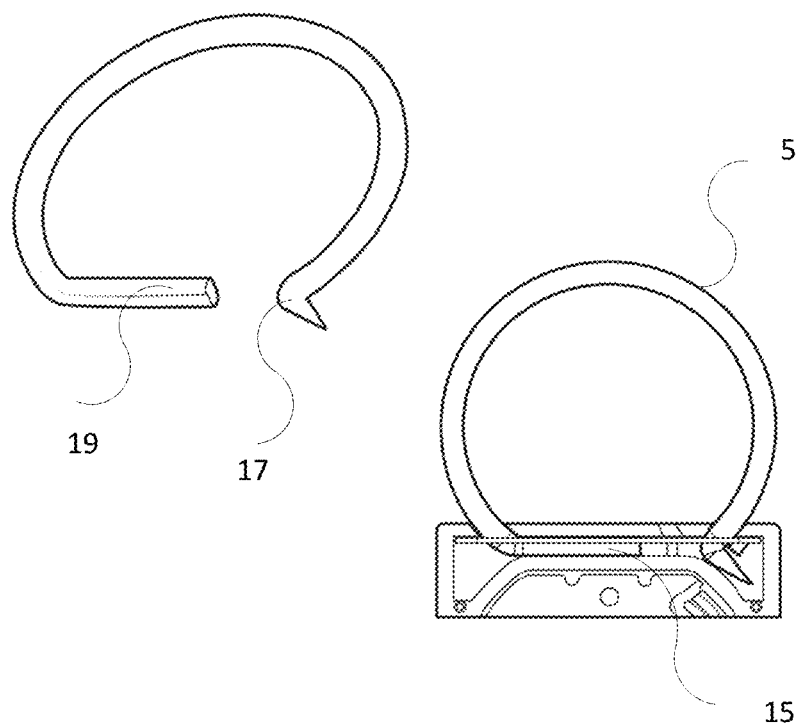
FIG. 2B illustrates an alternative embodiment of pin assemblies.

Referring now to FIG. 2A and FIG. 2B, two exemplary embodiments of pin assemblies are illustrated. A pin assembly may latch closed and may be maneuvered by squeezing or tilting to release. A pin assembly may have a lower part confined within built-in compartments of a housing within an interior space. An interior space may contain grooves, slots, latches, or other structures to secure closed an assembly pin. A pin assembly may have angled or flat ends for securing a pin assembly to an object and to compartments within interior space of a device housing.

Figure 3:
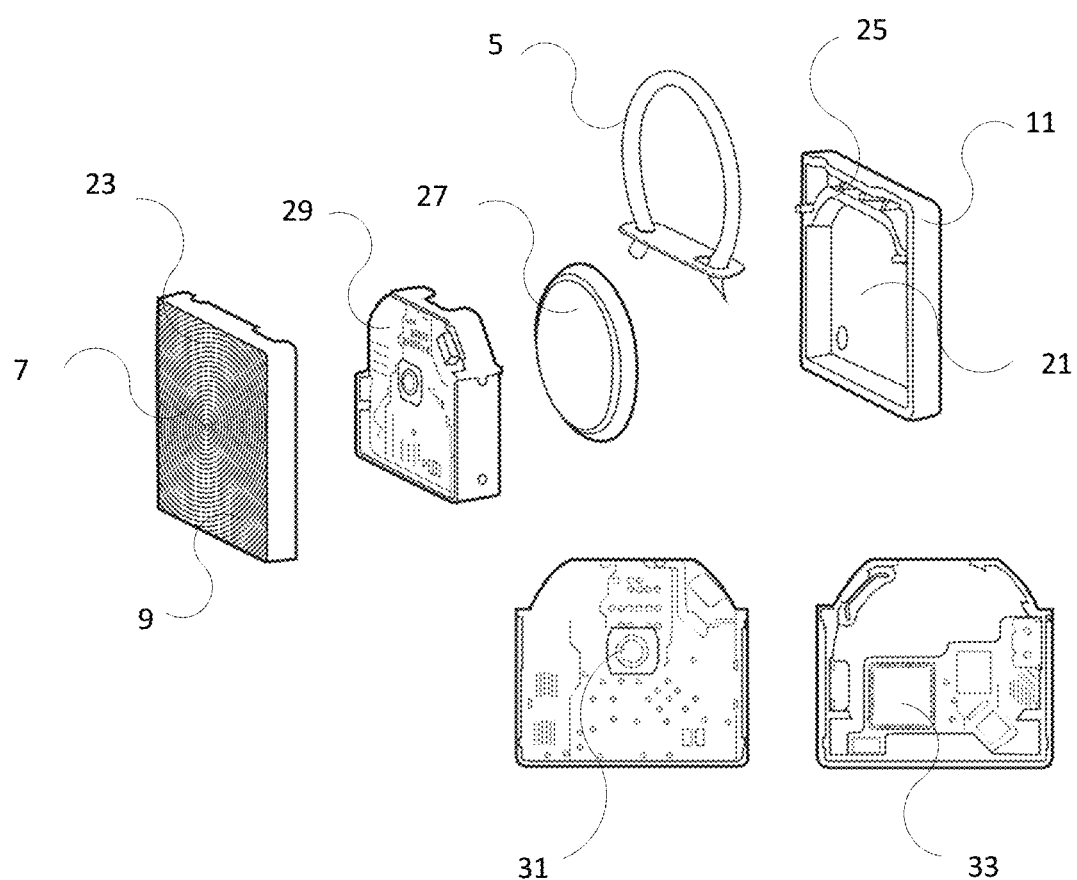
FIG. 3 illustrates an exploded view of an exemplary personal security device components.

Referring now to FIG. 3, an exploded view of an exemplary personal security device. In some embodiments, a device may comprise a front cover, a total PCB or circuit board assembly, at least one communications antenna, at least one tactile switch, a battery, an attachment piece, a contact spring, a main PCBA or frame, and a rear cover. A communications antenna may be for wireless communication over WiFi, cellular networks, data networks, satellite communication, NFC, and/or Bluetooth.

Figure 4:
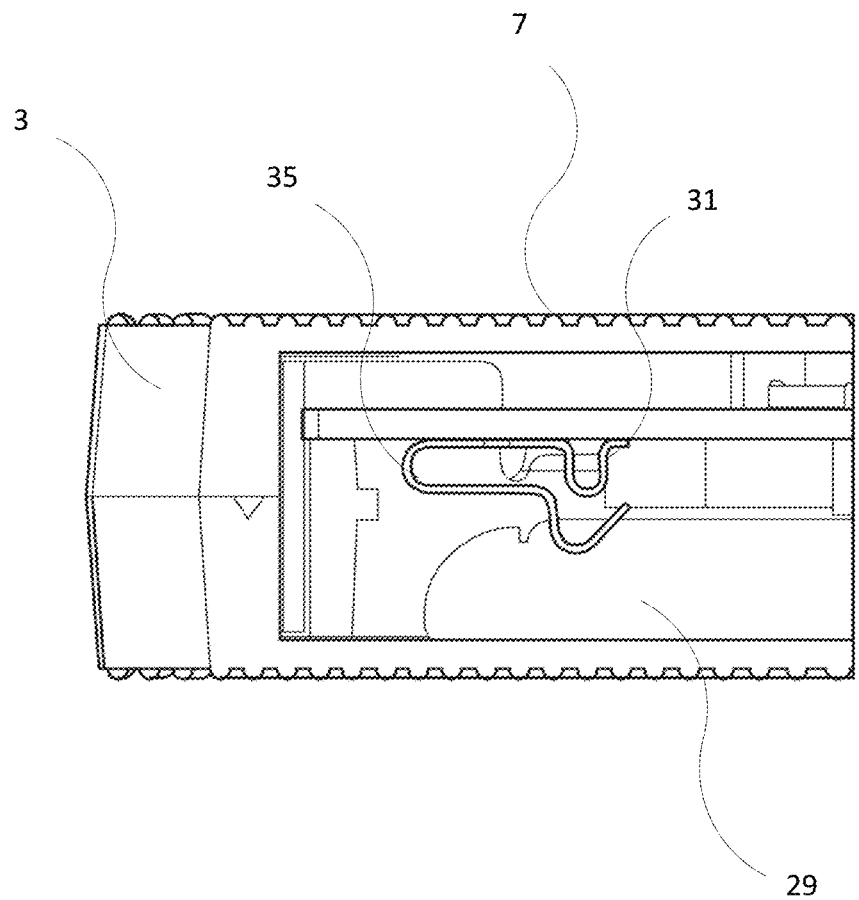
FIG. 4 illustrates the interior and exterior components of an exemplary tactile switch.

Referring now to FIG. 4, the interior and exterior components of an exemplary tactile switch are illustrated. A tactile switch may have tiered function or compressibility. For example pressing lightly may initiate one task, pressing a little harder may initiate a different task, and pressing a tactile switch to its maximum compression against a compact spring to its full contact depth may initiate another different task. Tactile switches may also respond to compression patterns. For example, a user may program within a corresponding device application that pressing a tactile switch three times in a row may initiate a notification to the nearest police station. In another example, pressing and holding for three seconds may initiate a notification to a designated guardian to have the guardian call/instant message to a user's corresponding smart device. In some embodiments, if a user does not have his/her smart device present, then an emergency tactile switch command may be programmed to initiate a notification to a first responder within a defined community network. A tactile switch may be manually activated by a user or may be activated by cross referencing biometric sensors and user data to algorithmically determine the severity of an emergency and which type of first responder is the best fit for the situation.

Figure 5:
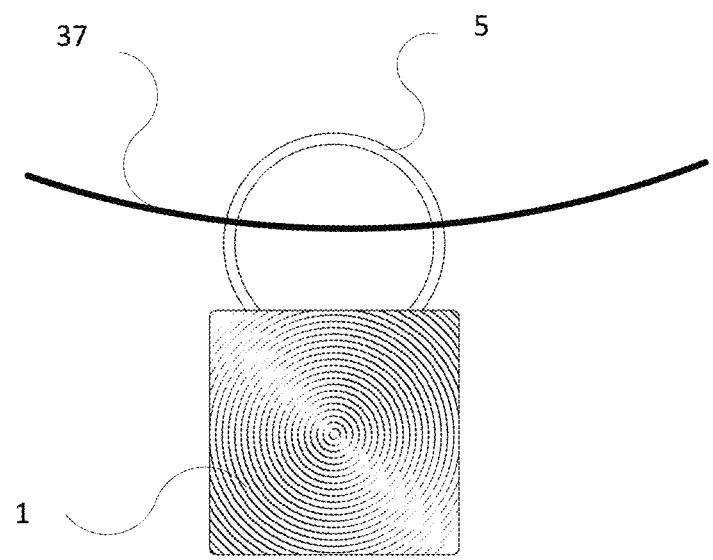
FIG. 5 illustrates an exemplary way of wearing a personal security device.

Referring now to FIG. 5, an exemplary way of wearing a personal security device is illustrated. A device may be worn with or on a worn personal article such as a piece of jewelry, hidden under a female's shirt by attaching to a bra strap, attached to a lapel or placed in a pocket, and in some examples, a device may replace a zipper pull on a jacket or any other item having a zipper. In addition, a device may be sewn into clothing or accessories so as to be built in. Various attachment pieces may be interchanged to suit the preferred attachment means. For example, a clip may be used to secure a device to the bottom of a baseball cap. An attachment piece such as a keychain may prevent a device from getting lost or falling out of a pocket. In some embodiments, a device may be concealed within accessory or jewelry compartments that may be compatible with tactile function and wireless communication between devices.

Figure 6:
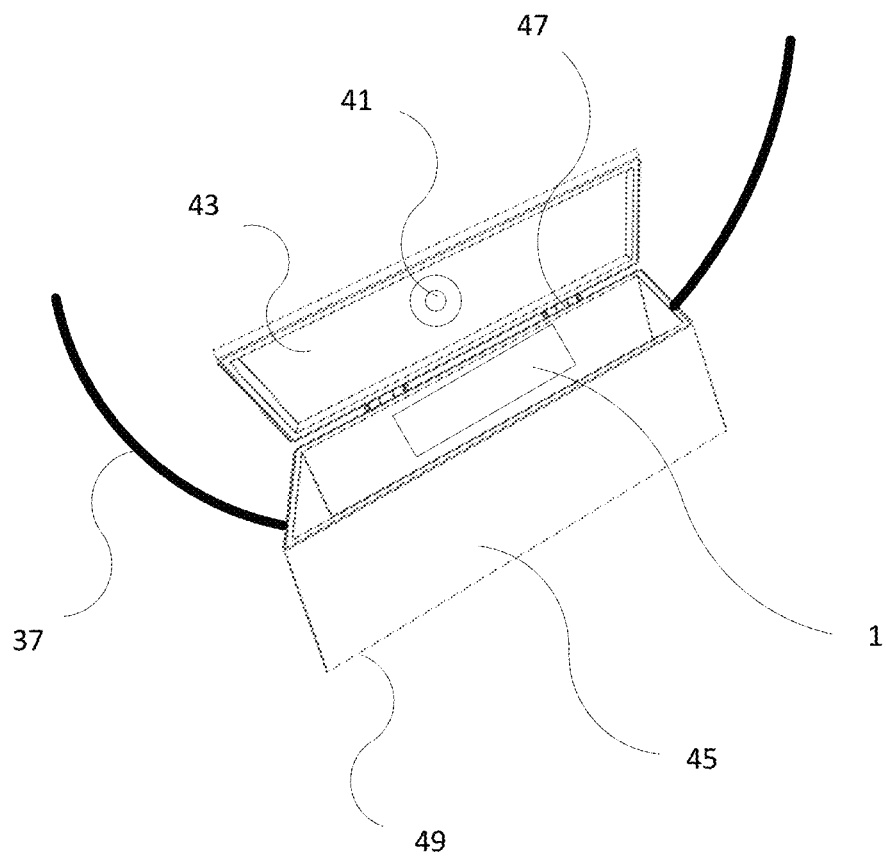
FIG. 6 illustrates an exemplary personal security device in a container.

Referring now to FIG. 6, an exemplary device in a wearable container is illustrated. The jewelry locket may comprise a top, a bottom, at least two sides to accommodate a device, and a tactile nodule for activating the device. In some embodiments, the container is closed, preventing removal of the device. In some embodiments, the container top is connected to at least one side by a hinge, allowing removal and replacement of the device.

Figure 7:
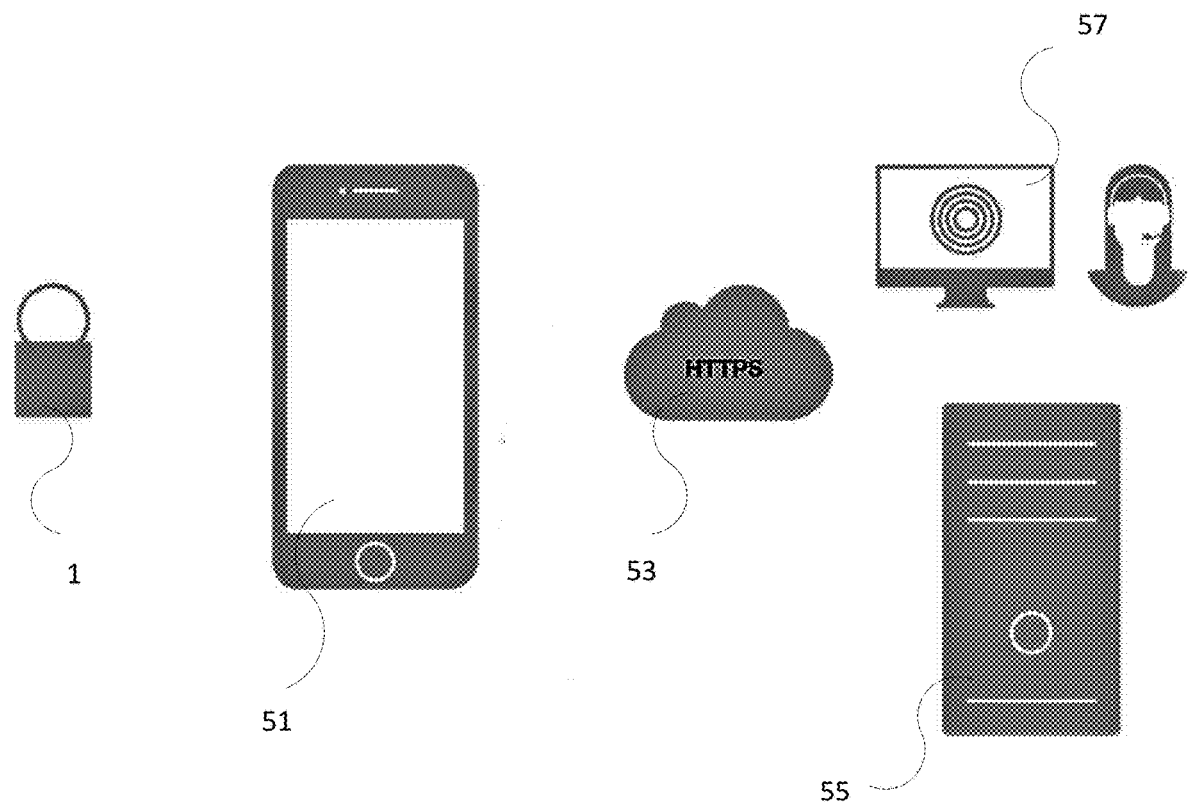
FIG. 7 illustrates a schematic of wireless communication in an exemplary personal security device system.

Referring now to FIG. 7, an exemplary personal security device system is illustrated. A personal device may be coupled to response service systems and applications. In some embodiments a system may comprise of a device in wireless communication with a smart device via an application further in wireless communication with a central processing unit, in further communication with first responders via a Web interface. A Web interface and a smart device application may allow users to customize their personal security preferences, designate guardians, set hierarchies, enter user identification data and medical information such as physical description and allergies. Notifications, push or automatic, may be available on Web interfaces and/or on smart device applications. User information may be stored in a server or other storage apparatus, so first responders may be better able to assist a user.

A user may configure tactile patterns and commands to initiate a variety of tasks. A user may configure which situations have a certain level of severity and what an appropriate task may be needed. A low-level emergency such as an uncomfortable social situation may require a task of initiating a false call or notification on a mobile device as an evasion technique to remove oneself from an uncomfortable situation. A high-level emergency may be configured to be for situations when a user becomes incapacitated and a task of calling for an ambulance may be necessary. A user may even configure initiation of non-security related tasks such as synchronizing a device with any smart device such as thermostats, music players, or any other device that has the ability to communicate wirelessly with other devices.

In some embodiments, an activated device to signal an emergency or less severe notification my ping to a nearby user's device. For example, based on past user habits and known criminal and mischief records, a device will compute spacing and pacing of a potential threat or potentially troublesome person toward the user and issue a notification to the user and/or the emergency response team. In another example, if a device or a portable electronic device malfunctions or locks, then synchronization may occur with a nearby user's device and/or software application on a portable electronic device. For example, a device may be pressed once to initiate a low risk response, twice to initiate a medium risk response, and three times to initiate a high risk response as customized by the user.

In another embodiment, a system may communicate via a variety of wireless communication networks and may automatically communicate over the best available network, multiple networks simultaneously, or a user-specified network without the need for separate wireless service contracts. A multi wireless communications capability improved personal security and safety assurance by providing an ability to connect to networks exclusive to a closed community as well as outside networks. In instance where a phone call is necessary with a first responder and a traditional cellular network is unavailable in a remote part of campus or an underground room, VOIP calling may be provided via a system server. A closed community may have one or more servers designated as hot spots and may be inside a building or outside a building.

Figure 8:
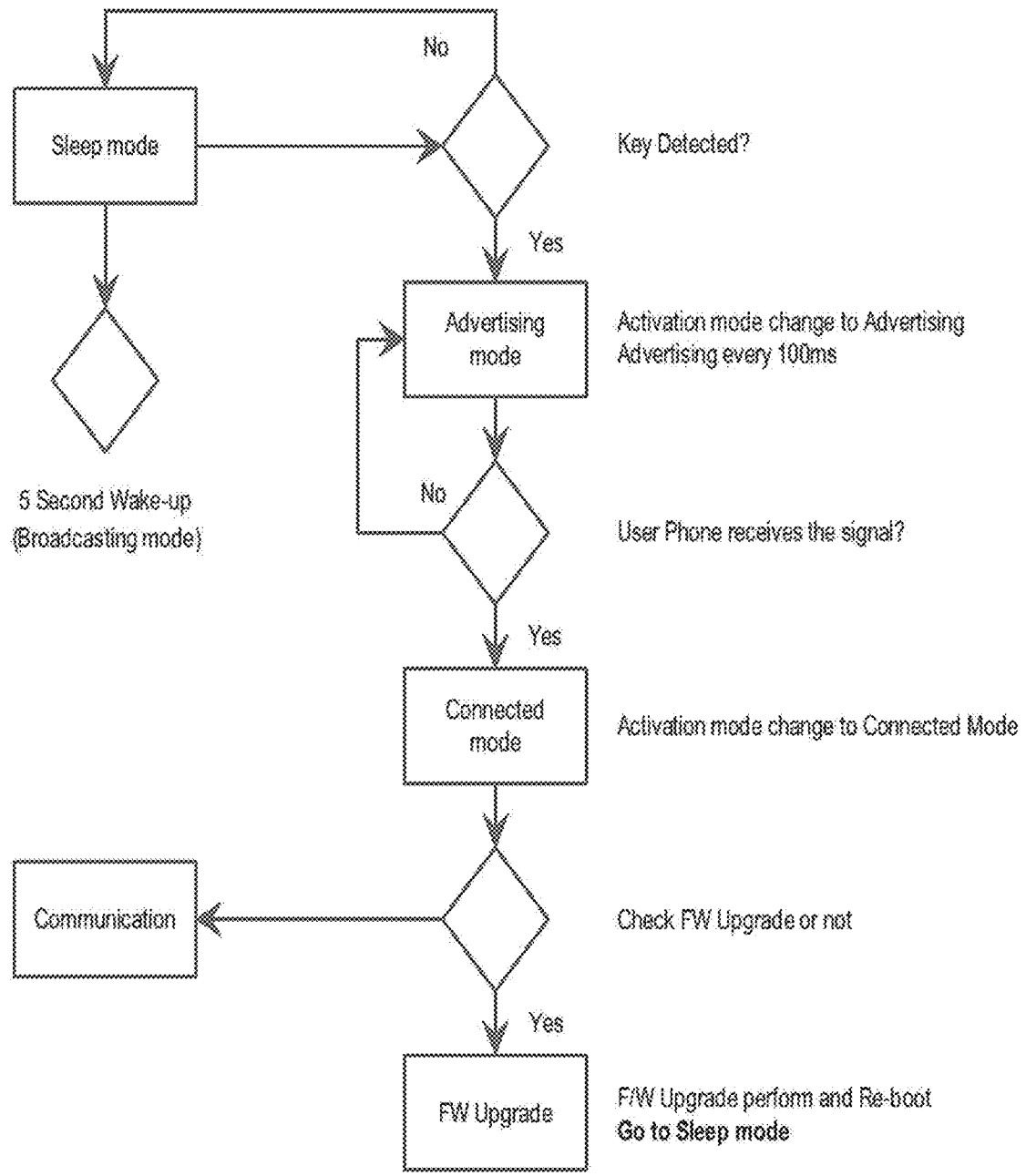
FIG. 8 illustrates exemplary method steps for initiating wireless communication between a device and a phone or smart device, part of a personal security device system.

Referring now to FIG. 8, exemplary method steps for initiating a personal security device system are illustrated. In preferred embodiments, a method as shown may enhance efficiency of a device and a system while also providing for wireless communication, notifications, software updates, advertisements, wireless pairing, or device sleep mode when a user is not wearing a device. A device may have motion sensors as well as kinetic energy converters to prolong the life of a device. Advertisements and paid content may be included in the system and may be displayed on a portable electronic device in wireless communication with a personal security device. Each device may be user-specific.

In some systems, a device may remain in a sleep mode and then activated to a broadcasting mode when a key is detected. Activation triggers advertisements on a user's smart device such as a phone that received a wireless signal. Once activated, the system and connects in connected mode and transmits the communication such as an advertisement. The advertisement may be in a multimedia format such as text, photographs, videos, sound, and combinations thereof. When an advertisement is not triggered, the system returns to sleep mode. Upgrades and reboots may also be selected or automatically activated and uploaded.

CONCLUSION

The foregoing is a complete description of the personal security device, methods of using the personal security device, and systems integrated with the personal security device. However, it is to be understood that the present invention is not limited to the particular descriptions disclosed and shown in the drawings. The present invention also comprises any modifications or equivalents within the scope of the claims.

What is claimed is:

1. A personal device for response services, the device comprising:
 a front cover,
 a total printed circuit board or circuit board assembly,
 at least one communications antenna,
 a single tactile switch in communication with said printed circuit board or circuit board assembly and with said at least one communications antenna,
 a battery,
 an attachment piece having a pin assembly, a pin assembly lower part, a latch, and an end,
 a contact spring in contact with and between said single tactile switch and said printed circuit board or circuit board assembly,
 a frame,
 and a rear cover; and
 wherein the single tactile switch responds to compression patterns to indicate a spectrum of degrees of emergency; and
 wherein the single tactile switch is activated by a user to initiate a notification to a first responder within a user-defined community network; and
 wherein the single tactile switch is either manually activated by a user or activated by cross referencing user data via said at least one communications antenna;
 whereby the device is pressed once to initiate a low risk response to indicate the degree of emergency from a single tactile switch, pressed twice to initiate a medium risk response, and pressed three times to initiate a high risk response.

2. The device according to claim 1 wherein the at least one communications antenna is a Bluetooth transmitter, a wireless fidelity transmitter, or a near field communication transmitter.

3. The device according to claim 1 wherein the device is housed in a container that does not require an activation button or tactile switch and that is worn on a person.

4. The device according to claim 3 wherein the container is a jewelry locket that completely covers the device.

5. The device according to claim 4 wherein the jewelry locket comprises a top, a bottom, at least two sides to accommodate a device, and an interior tactile nodule not outwardly visible for activating the device.

6. The device according to claim 5 wherein the container is closed, preventing removal and viewing of the device.

7. The device according to claim 1 wherein the device is attached to a personal article.

8. The device according to claim 7 wherein the personal article is jewelry.

9. The device according to claim 7 wherein the personal article is a zipper on clothing.

10. The device according to claim 7 wherein the personal article is a bra strap.

11. The device according to claim 1 wherein the device is integrated with a personal security, concierge, or service system.

12. The device according to claim 1 further comprising a global positioning system device.

13. A method of activating a personal device for response services, the device comprising
 a front cover,
 a total printed circuit board or circuit board assembly,
 at least one communications antenna,
 a single tactile switch in communication with said printed circuit board or circuit board assembly and with said at least one communications antenna,
 a battery,
 an attachment piece having a pin assembly, a pin assembly lower part, a latch, and an end,
 a contact spring in contact with and between said single tactile switch and said printed circuit board or circuit board assembly, a frame, and a rear cover; and wherein the single tactile switch responds to compression patterns to indicate a spectrum of degrees of emergency; and wherein the single tactile switch is activated by a user to initiate a notification to a first responder within a user-defined community network; and wherein the single tactile switch is either manually activated by a user or activated by cross referencing user data via said at least one communications antenna, the method steps comprising:

unlatching the attachment piece by disengaging the latch from the pin assembly lower part;

hooking the attachment piece to a personal article;

latching the attachment piece by re-engaging the latch into the pin assembly lower part; and pressing a surface of the device front cover to activate the tactile switch;

whereby the device is pressed once to initiate a low risk response to indicate the degree of emergency from the single tactile switch, pressed twice to initiate a medium risk response, and pressed three times to initiate a high risk response.

14. The method steps according to claim 13 further comprising connecting to a wireless communications network.

15. The method steps according to claim 14 further comprising activating a response.

16. The method steps according to claim 14 further comprising activating an advertisement campaign.

* * * * *